A. M. KUHN.
BALL AND SOCKET JOINT.
APPLICATION FILED MAR. 22, 1918.

1,337,235.

Patented Apr. 20, 1920.

A. M. Kuhn, Inventor

By C. A. Snow & Co.
Attorneys

Witness

UNITED STATES PATENT OFFICE.

ADAM M. KUHN, OF KEARNEY, NEBRASKA, ASSIGNOR OF ONE-THIRD TO CHARLES M. KUHN AND ONE-THIRD TO JACOB E. HERMAN, BOTH OF KEARNEY, NEBRASKA.

BALL-AND-SOCKET JOINT.

1,337,235.  Specification of Letters Patent.  Patented Apr. 20, 1920.

Application filed March 22, 1918. Serial No. 223,977.

*To all whom it may concern:*

Be it known that I, ADAM M. KUHN, a citizen of the United States, residing at Kearney, in the county of Buffalo and State of Nebraska, have invented a new and useful Ball-and-Socket Joint, of which the following is a specification.

The device forming the subject matter of the present invention is a ball and socket joint, the joint being designed as a connection between the piston of an internal combustion engine and the connecting rod, though the joint is adapted for use in connecting other pistons to their rods and for other purposes.

The main object of the invention is the provision of a thoroughly flexible joint between a piston and connecting rod.

The invention also contemplates the provision of an adjustable bearing for the ball.

A still further object within the contemplation of the invention is the provision of means for locking the bearing in set or adjusted position.

The invention also contemplates the provision of a detachable ball and means for locking the ball in place upon the connecting rod.

A still further object of the invention is to generally improve the joint between a piston and connecting rod.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

A practical embodiment of the invention is shown in the accompanying drawing, wherein:—

Figure 1:
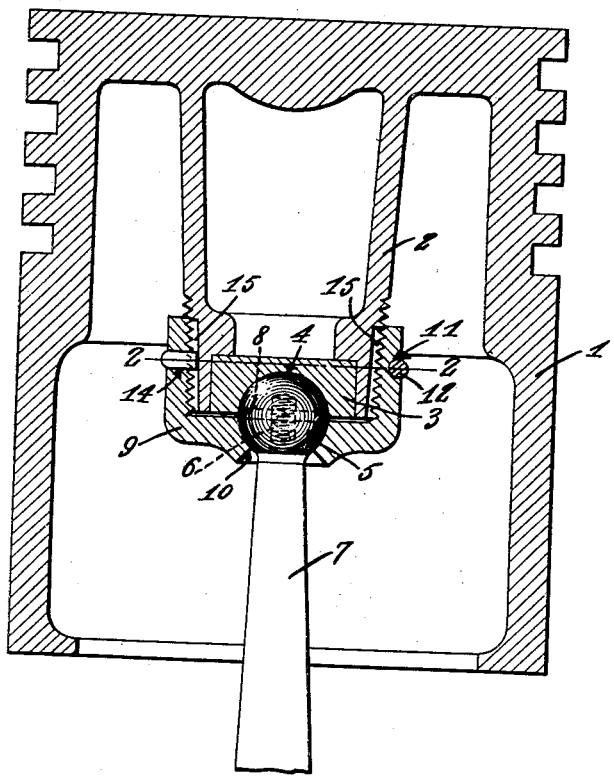
Figure 1 is a longitudinal section of a piston constructed with a joint such as contemplated by the invention, a fragment of the connecting rod being in elevation.
Figure 2:
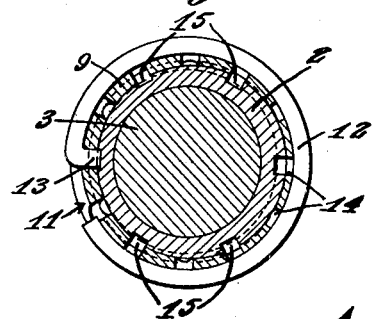
Fig. 2 is a section on the line 2—2 of Fig. 1.

Referring to the drawing by numerals of reference:—

The usual hollow piston is indicated at 1 which, in this instance, is formed with a cylindrical projection 2 positioned centrally of and extending inwardly from the piston head. The cylindrical projection 2 is shown herein as cored, though such formation is not essential.

The inner or free end of the cylindrical projection 2 is countersunk to receive a bearing block 3, which is provided with a centrally disposed, hemispherical concavity 4 supplying a seat for the ball 5.

The ball 5 is tapped to be threaded onto the reduced end 6 of the connecting rod 7. A bore 8 is drilled diametrically of the ball 5 and alines with a similar bore formed in the reduced end 6, when the ball is in place upon said end, for the purpose of receiving a pin by which the ball may be locked against turning.

A cap 9 is threaded on the inner end of the cylindrical projection 2, and the head of this cap is centrally apertured, as at 10, to permit the passage therethrough of the connecting rod 7. The inner face of the cap 9, at the periphery of the aperture 10, is counter-bored to provide a seat for the ball 5, while the outer face is countersunk to allow free swing to the connecting rod. An annular groove 11 is formed in the outer face of the flange of the cap 9 and is adapted to receive a split resilient ring 12 which seats in the groove. One end of the ring 12 is angled, as at 13, to project through apertures 14 which are formed in and spaced circumferentially of the cap 9, and which apertures are positioned in the bottom of the groove 11.

Longitudinally extending grooves 15 are formed in and spaced circumferentially of the projection 2, and are adapted to selectively receive the inwardly extending end of the bent end 13 of the ring 12, whereby the cap is locked in adjusted position upon the projection 2. By this means the socket may be properly adjusted to contact the ball without undue friction and with a minimum of play. In operation, the connecting rod 7 exerts a lateral thrust, the cap 9 and the ring 12 serving as reinforcements against the aforesaid thrust.

Having thus described the invention, what is claimed as new and sought by Letters Patent, is:—

In a device of the class described, a piston having an internal axial projection; a bearing seated in the end of the projection; a cap threaded on the outer surface of the projection; a connecting rod embodying a ball mounted to rock between the cap and the bearing; and a combined means for reinforcing the cap and the projection against the lateral thrust of the connecting rod and for holding the cap against rotation and detachment, said means consisting of a prehensile element substantially surrounding the cap and including a part passing through the cap and engaging the projection.

In testimony that I claim the foregoing as my own, I have hereto affixed my signature in the presence of two witnesses.

ADAM M. KUHN.

Witnesses:
 VERNON BASS,
 WM. BIDWELL.